United States Patent
Doucette et al.

(10) Patent No.: US 7,290,013 B2
(45) Date of Patent: Oct. 30, 2007

(54) SPACE ALLOCATION IN A WRITE ANYWHERE FILE SYSTEM

(75) Inventors: Douglas P. Doucette, Freeland, WA (US); Blake Lewis, Los Altos Hills, CA (US); John Edwards, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 426 days.

(21) Appl. No.: 10/688,070

(22) Filed: Oct. 17, 2003

(65) Prior Publication Data

US 2004/0139273 A1 Jul. 15, 2004

Related U.S. Application Data

(63) Continuation of application No. 09/642,065, filed on Aug. 18, 2000, now Pat. No. 6,636,879.

(51) Int. Cl.
*G06F 17/30* (2006.01)
*G06F 17/00* (2006.01)

(52) U.S. Cl. .............. 707/200; 707/201; 707/102; 707/203; 707/204; 707/100

(58) Field of Classification Search ........... 707/201, 707/202–204, 205; 360/48; 369/30.09; 711/165, 173, 100; 714/4, 6
See application file for complete search history.

(56) References Cited

U.S. PATENT DOCUMENTS

| 5,237,682 | A | | 8/1993 | Bendert et al. ............ 707/205 |
|---|---|---|---|---|
| 5,819,292 | A | * | 10/1998 | Hitz et al. ................... 707/203 |
| 5,956,745 | A | | 9/1999 | Bradford et al. ............ 711/137 |
| 6,038,570 | A | * | 3/2000 | Hitz et al. ................... 707/204 |
| 6,311,193 | B1 | * | 10/2001 | Sekido ........................ 707/202 |
| 6,453,325 | B1 | | 9/2002 | Cabrera et al. ............. 707/204 |
| 6,636,879 | B1 | * | 10/2003 | Doucette et al. ............ 707/205 |

FOREIGN PATENT DOCUMENTS

| WO | WO 94/29796 A1 | 12/1994 |
|---|---|---|
| WO | WO 02/17057 A2 | 2/2002 |

\* cited by examiner

*Primary Examiner*—Apu Mofiz
*Assistant Examiner*—Cindy Nguyen
(74) *Attorney, Agent, or Firm*—Blakely Sokoloff Taylor & Zafman LLP

(57) ABSTRACT

The invention provides a method and system for improving data access of a reliable file system. In a first aspect of the invention, the file system determines the relative vacancy of a collection of storage blocks, herein called an "allocation area". This is accomplished by recording an array of binary numbers. Each binary number in the array describes the vacancy of a collection of storage blocks. The file system examines these binary numbers when attempting to record file blocks in relatively contiguous areas on a storage medium, such as a hard disk. When a request to write to disk occurs, the system determines the average vacancy of all the allocation areas and queries the allocation areas for individual vacancy rates such as sequentially. The system preferably writes file blocks to the allocation areas that are above a threshold related to the average storage block vacancy of the file system. If the file in the request to write is larger than the selected allocation area, the next allocation area above the threshold is preferably used to write the remaining blocks of the file.

14 Claims, 2 Drawing Sheets

SPACE ALLOCATION IN A WRITE ANYWHERE FILE SYSTEM

CROSS-REFERENCE TO RELATED APPLICATION

This application hereby incorporates by reference and claims benefit of U.S. application Ser. No. 09/642,065, filed Aug. 18, 2000, now U.S. Pat. No. 6,636,879.

BACKGROUND OF THE INVENTION

1. Field of Invention

This invention relates to data storage systems.

2. Related Art

Data is arranged in physical locations on storage mediums. A collection of data, such as a file, can be written to, read from and (in most mediums) erased from a storage medium. Known disk drives store files in specific allocation areas on a hard disk known as storage blocks. These storage blocks record and store a standard quantity of information, such as 4 K bytes. Therefore, files stored on known disk drives are divided into similarly sized file blocks for storage on the disk drive.

A preferred arrangement for storing files is to place as much of the data as possible in contiguous or nearly contiguous blocks. This allows the data files to be retrieved or written relatively quickly because the disk drive reads or writes from relatively contiguous data storage blocks without having to move the disk heads substantial distances before locating and reading or writing further blocks.

Known file systems allow data to be reorganized by moving data from block to block. For example, known disk defragmentation products perform this function for user workstations. This allows file blocks to be written to convenient locations on disk, and have their positions optimized later (such as by copying, moving and erasing data in disk storage blocks in order to get as many contiguous blocks per file for as many files as possible).

One aspect of a WAFL (Write Anywhere File Layout) file system (further described in the Incorporated Disclosures shown below), and possibly of other reliable file systems, is that reliability of disk data storage is improved by maintaining all file system blocks in the disk storage blocks at which they were originally written to disk. When a file system block is changed, a new disk storage block is allocated for the changed file system block, and the old file system block is retained for possible backup and other purposes. Records are kept of numerous previous consistent states of the file system. If the current state of the system fails, a previous state can be re-instated. However, this requires that all data storage blocks allocated for the previous states be protected. Thus, a storage block is not erased or reallocated until all previous states of the system using that block are no longer needed. This can often take weeks or months.

One problem with this method of user deleted file block is the distribution of free space can become extremely non-uniform. When disk storage blocks are desired for relatively contiguous storage, previously written data storage blocks generally cannot be erased for that purpose. Thus, in a reliable file system, another storage approach is needed to optimize the writing of file blocks to storage blocks.

One solution is to write file blocks to the first disk blocks encountered in a linear search of the disk or disks. However, this solution suffers from the drawback that it can result in scattered file storage blocks.

A second solution is to search through the disk or disks, seeking a sufficient number of contiguous blocks to hold a given file. However, this approach suffers from the drawback that it is relatively slow and uses a relatively excessive amount of computing resources.

Accordingly, it would be desirable to provide an improved technique for locating relatively large free locations on a storage medium in an efficient manner, that is not subject to drawback of the known art.

SUMMARY OF THE INVENTION

The invention provides a method and system for improving data access of a reliable file system.

In a first aspect of the invention, the file system determines the relative vacancy of a collection of storage blocks, herein called an "allocation area". This is accomplished by recording an array of vacancy values. Each vacancy value in the array describes a measure of the vacancy of a collection of storage blocks. The file system examines these vacancy values when attempting to record file blocks in relatively contiguous areas on a storage medium, such as a hard disk. When a request to write to disk occurs, the system determines the average vacancy of all the allocation areas and queries the allocation areas for individual vacancy values. The system preferably writes file blocks to the allocation areas that are above a threshold related to the average storage block vacancy of the file system. If the file in the request to write is larger than the selected allocation area, the next allocation area found to be above the threshold is preferably used to write the remaining blocks of the file.

DETAILED DESCRIPTION OF THE PREFERRED EMBODIMENT

Figure 1:
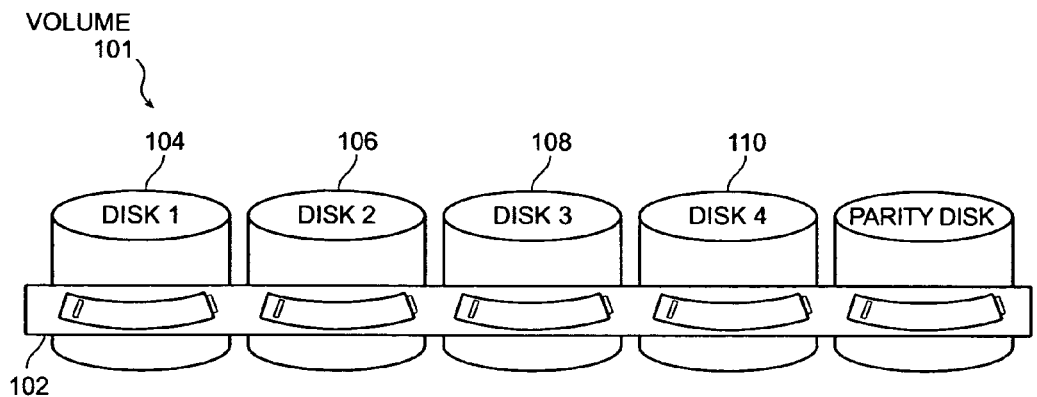
FIG. 1 shows a block diagram for a volume of a system for improved space allocation on disk storage.

In the following description, a preferred embodiment of the invention is described with regard to preferred process steps and data structures. However, those skilled in the art would recognize, after perusal of this application, that embodiments of the invention might be implemented using a variety of other techniques without undue experimentation or further invention, and that such other techniques would be within the scope and spirit of the invention.

RELATED APPLICATIONS

Inventions described herein can be used in conjunction with technology described in the following documents.

U.S. patent application Ser. No. 09/642,063, Express Mail Mailing No. EL 524781089US, filed Aug. 18, 2000, in the name of Blake LEWIS, now U.S. Pat. No. 6,640,233, titled "Reserving File System Blocks"

U.S. patent application Ser. No. 09/642,062, Express Mail Mailing No. EL524780242US, filed Aug. 18, 2000, in the name of Rajesh SUNDARAM, titled "Dynamic Data Storage"

U.S. patent application Ser. No. 09/642,061, Express Mail Mailing No. EL524780239US, filed Aug. 18, 2000, in the name of Blake LEWIS, titled "Instant Snapshot"

U.S. patent application Ser. No. 09/642,066, Express Mail Mailing No. EL524780256US, filed Aug. 18, 2000, in the name of Ray CHEN, titled "manipulation of Zombie Files and Evil-Twin Files" and application Ser. No. 09/642,064, in the names of Scott SCHOENTHAL, Express Mailing Number EL524781075US, titled "Persistent and Reliable Delivery of Event Messages", assigned to the same assignee, and all pending cases claiming the priority thereof.

Each of these documents is hereby incorporated by reference as if fully set forth herein. This application claims priority of each of these documents. These documents are collectively referred to as the "Incorporated Disclosures."

Lexicography

As used herein, use of the following terms refer or relate to aspects of the invention as described below. The general meaning of these terms is intended to be illustrative and in no way limiting.

Inode—In general, the term "inode" refers to data structures that include information about files in Unix and other file systems. Each file has an inode and is identified by an inode number (i-number) in the file system where it resides. Inodes provide important information on files such as user and group ownership, access mode (read, write, execute permissions) and type. An inode points to the inode file blocks.

Sector—In general, the term "sector" refers to a physical section of a disk drive containing a collection of bytes, such as 512 bytes.

Data Storage Block—In general, the phrase "data storage block" refers to specific areas on a hard disk. The area, in the preferred embodiment, is a collection of sectors, such as 8 sectors or 4,096 bytes, commonly called 4 K bytes.

File Block—In general, the phrase "file block" refers to a standard size block of data including some or all of the data in a file. The file block, in the preferred embodiment, is approximately the same size as a data storage block.

fsinfo (File System Information Block)—In general, the phrase "file system information block" refers to one or more copies of a block known as the "fsinfo block". These blocks are located at fixed locations in the volume. The fsinfo block includes data about the volume including the size of the volume, volume level options, language and more.

WAFL (Write Anywhere File Layout)—In general, the term "WAFL" refers to a high level structure for a filer system. Pointers are used for locating data. All the data is contained in files. These files can be written anywhere on the disk in chunks of file blocks placed in data storage blocks.

Volume—In general, the term "volume" refers to a single file system. The file system may be composed of a collection of disk drives.

VBN (Volume Block Number)—In general, the term "VBN" refers to the location of a tuple of a particular block in a volume of the file system. The VBN tuple is the disk number and the disk block number.

DBN (Disk Block Number)—In general, the term "DBN" refers to the a particular block location on a disk in a volume of the file system.

Stripe—In general, the term "stripe" refers to the collection of blocks in a volume with the same DBN on each disk.

Consistency Point (CP)—In general, the term "CP" refers to a time that a file system reaches a consistent state. When this state is reached, all the files have been written to all the blocks and are safely on disk and the one or more copies of redundant fsinfo blocks get written out. If the system crashes before the fsinfo blocks go out, all other changes are lost and the system reverts back to the last CP. The file system advances atomically from one CP to the next.

Consistent State—In general, the phrase "consistent state" refers to the system configuration of files in blocks after the CP is reached.

Range—In general, the term "range" refers to a group of blocks, such as 1,024 blocks.

Allocation Area—In general, the phrase "allocation area" refers to a large group of blocks in a volume, such as 4,096 blocks or a collection of four ranges.

Locality—In general, the term "locality" refers to the proximity of blocks within an area such as an allocation area with data storage blocks for the same file. Files with good locality are faster to access because they can be read from blocks that are either contiguous or in close proximity to other blocks of the file.

Filesystem—In general, the term "filesystem" refers to a data processing application that manages individual files.

Active File—In general, the phrase "active file" refers to the current file system arrived at with the most recent CP. In the preferred embodiment, the active file includes the active map, the summary map and points to all snapshots and other data storage blocks through a hierarchy of inodes, indirect data storage blocks and more.

Active Map—In general, the phrase "active map" refers to a block including a bitmap associated with the vacancy of blocks of the active file. The active map points to the rest of the current active file system tree.

Snapshot—In general, the term "snapshot" refers to a file that is identical to the active file when the snapshot is written. The snapshot diverges from the active file over time as new files are written. A snapshot can be used to return the file system to a particular CP, consistency point.

Snapmap—In general, the term "snapmap" refers to a block including a bitmap associated with the vacancy of blocks of a snapshot. The snapmap diverges from the current active map over time as files are written after a consistency point.

Summary Map—In general, the term "summary map" refers to a block including an IOR (inclusive OR) bitmap of all the Snapmaps.

Space Map—In general, the term "space map" refers to a block including an array of binary numbers that describes the amount of free storage blocks in an allocation area.

Blockmap—In general, the term "blockmap" refers to a bitmap describing the status of a group of storage blocks in specified locations.

Snapdelete—In general, the term "snapdelete" refers to a command that removes a particular snapshot from the file system. This command can allow a storage block to be freed for reallocation provided no other snapshot or the active file uses the storage block.

As described herein, the scope and spirit of the invention is not limited to any of the specific examples shown herein, but is intended to include the most general concepts embodied by these and other terms.

System Elements

FIG. 1 shows a block diagram for a volume of a system for improved space allocation on disk storage.

The volume 101 includes all the data blocks in the file system 100, which may include one or more hard disk drives. In alternative embodiments, the file system 100 may include any computer data storage system such as a database system or a store and forward system such as cache or RAM.

The volume 101 is broken up into a collection of allocation areas 102. Each allocation area is composed of a set of stripes with consecutive DBN values, such as 4,096 stripes. The allocation areas 102 can be broken down further into a group of ranges per disk 104, 106, 108 and 110. In a preferred embodiment, the ranges 104, 106, 108 and 110 include a group of 1,024 blocks that are described by the spacemap's 16 bit binary number for allocation usage. A binary number quantifying the amount of used (unavailable for writing) blocks represents the allocation areas 102 in the spacemap. A low value of the binary number for a particular allocation area 102 represents a high number of blocks being available for being written to. Conversely, a high value represents a small number of blocks being available for allocation. The spacemap binary values are organized by VBN number. Therefore, the relationship between a used block count of an allocation area 102 and the spacemap binary values is approximate.

Figure 2:
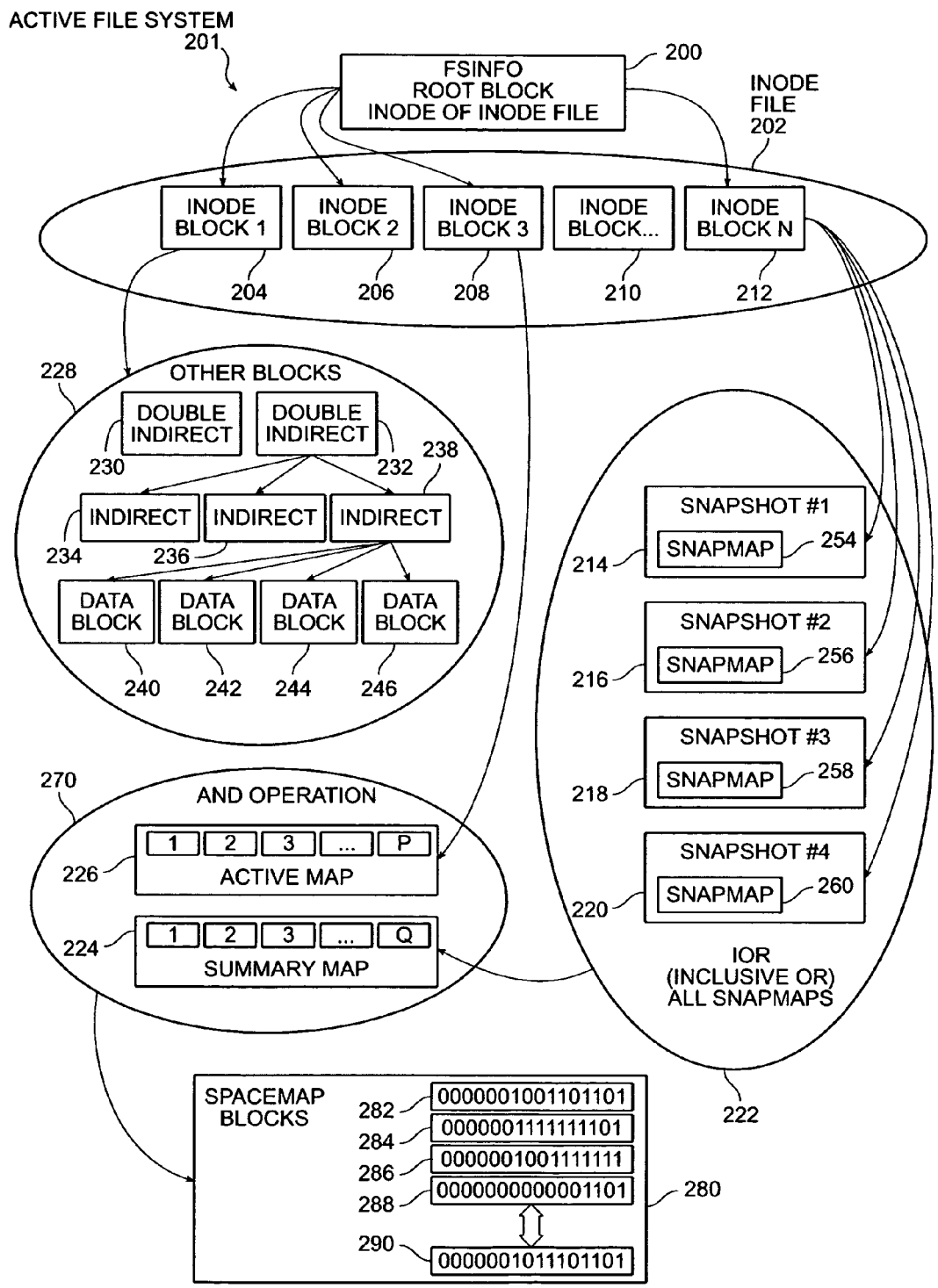
FIG. 2 shows a block diagram of a system for improved space allocation on disk storage.

FIG. 2 shows a block diagram of a system for improved space allocation on disk storage.

The root block 200 includes the inode of the inode file 202 plus other information regarding the active file system 201, the active map 226, previous active file systems known as snapshots 214, 216, 218 and 220, and their respective snapmaps 254, 256, 258 and 260.

The active map 226 of the active file system 201 that is a bitmap associated with the vacancy of blocks for the active file system 201. The respective snapmaps 254, 256, 258 and 260 are active maps that can be associated with particular snapshots 214, 216, 218 and 220. Summary map 224 is an inclusive OR of the snapmaps 254, 256, 258 and 260. Also shown are other blocks 228 including double indirect blocks 230 and 232, indirect blocks 234, 236 and 238 and data blocks 240, 242, 244 and 246. Finally, FIG. 2 shows the spacemap 280 including a collection of spacemap blocks of binary numbers 282, 284, 286, 288 and 290.

The root block 200 includes a collection of pointers that are written to the file system when the system has reached a new CP (consistency point). The pointers are aimed at a set of indirect (or triple indirect, or double indirect) inode blocks (not shown) or directly to the inode file 202 consisting of a set of blocks known as inode blocks 204, 206, 208, 210 and 212.

The number of total blocks determines the number of indirect layers of blocks in the file system. As with all blocks in the system, the root block 200 includes a standard quantity of data, such as 4,096 bytes with 8 bit bytes. Thus blocks in a preferred embodiment all have approximately 32 K bits. 16 bytes of the root block 200 are used to describe itself including the size of the file system, the time it was created and other pertinent data. The remaining approximately 32 K bits in the root block 300 are a collection of pointers to the inode blocks 204, 206, 208, 210 and 212 in the inode file 202. Each pointer in the preferred embodiment is made of 16 bytes. Thus, there are approximately 2,000 pointer entries in the root block 200 aimed at 2,000 corresponding inode blocks of the inode file 202 each including 4 K bytes. If there are more than 2,000 inode blocks, indirect inode blocks are used.

An inode block 204 in the inode file 102 is shown in FIG. 2 pointing to other blocks 228 in the active file system 201 starting with double indirect blocks 230 and 232 (there could also be triple indirect blocks). These double indirect blocks 230 and 232 include pointers to indirect blocks 234, 236 and 238. These indirect blocks 234, 236 and 238 include of pointers that are directed to data leaf blocks 240, 242, 244 and 246 of the active file system 201.

Inode block 208 in the inode file 202 points to a set of blocks (1,2,3, . . . , P) called the active map 226. Each block in the active map 226 is a bitmap where each bit corresponds to a block in the entire volume. A "1" in a particular position in the bitmap correlates with a particular allocated block in the active file system 201. Conversely, "0" correlates to the particular block being free for allocation in the active file system 201. Each block in the active map 226 can describe up to 32 K blocks or 128 MB. For a 6 TB volume, only 24 blocks are needed in the active map 226.

Another inode block in the inode file 202 is inode block N 212. This block includes a set of pointers to a collection of snapshots 214, 216, 218 and 220 of the volume. Each snapshot includes all the information of a root block and is equivalent to an older root block from a previous active file system. The newest snapshot 214 is created at the completion of the most recent CP. The newest snapshot 214 includes a collection of pointers that are aimed directly or indirectly to the same inode file 202 as the root block 200 of the active file system 201. As the active file system 201 changes from files being written to the file system, the most recent snapshot 214 and the current root block 200 diverge. The active file system 201 also changes from changing file properties, creating new files and deleting old files. Snapshots initially point to the same type of structure as the active file system 201. The newest snapshot 214 is associated with snapmap 254. Snapmap 254 is a bit map that is initially the equivalent to the active map 226. The older snapshots 216, 218 and 210 have a corresponding collection of snapmaps 256, 258 and 260. Like the active map 226, these snapmaps 256, 258 and 260 include a set of blocks including bitmaps that correspond to allocated and free blocks for the particular CP when the particular snapmaps 256, 258 and 260 were created. Because any active file system has a structure that includes one or more snapshots, it follows that snapshots contain pointers to older snapshots. There can be a large number of previous snapshots in any given snapshot.

Blocks not used in the active file system 201 are not necessarily available for allocation or reallocation because the system is a highly reliable data storage system. In fact, blocks that have once been allocated are difficult to ever free up again. Generally, allocated blocks might be freed by removing a snapshot using the snapdelete command. If no other snapshot or active files uses the block, then the block can be freed and written over during the next copy on execution by WAFL The system can relatively efficiently determine whether a block can be removed using the "nearest neighbor rule". If the previous and next snapshot do not allocate a particular block in their respective snapmaps, then the block can be deleted during snapdelete, otherwise the block can not be deleted. The difficulty in freeing blocks results in a system that becomes extremely non-uniform in space allocation. It is extremely inefficient to search through the system, block by block. The snapshots 214, 216, 218 and 220 could be searched for their respective snapmaps 254, 256, 258 and 260 to determine blocks allocated or free from all the snapshots. Combined with the active map 226, all blocks in the volume could be determined as to their availability for writing files. However, this is relatively inefficient (although not as inefficient as linearly searching all blocks) because of the size and structure of the snapshots.

Instead, a summary map 224 is created by using an IOR (inclusive OR) operation 222 on the snapmaps 254, 256, 258 and 260. Like the active map 226 and the snapmaps 254, 256, 258 and 260, the summary map 224 is a set of blocks (1, 2, 3, ..., Q) containing bitmaps. Each bit in each block of the summary map 224 describes the allocation status of one block in the system with "1" being allocated and "0" being free. The summary map 224 describes the allocated and free blocks of the entire volume from all the snapshots 214, 216, 218 and 220 combined. One of the main uses of the summary map 224 is locating blocks that are potentially available for reallocation using snapdelete. Thus, the system creates the summary map 124 in the background, when time is available rather than at a CP.

An AND operation 270 on sets of blocks (such as 1,024 blocks) of the active map 226 and the summary map 224 produces a spacemap 280. Unlike the active map 226 and the summary map 224, which are a set of blocks containing bitmaps, the spacemap 280 is a set of blocks including 282, 284, 286, 288, and 290 containing arrays of binary numbers. The binary numbers in the array represent the addition of all the occupied blocks in a region known as a range containing a fixed number of blocks, such as 1,024 blocks. The array of binary numbers in the single spacemap block 282 represents the allocation of all blocks for all snapshots and the active file in one range of 1,024 blocks. Each of the binary numbers 282, 284, 286, 288, and 290 in the array are a fixed length. In a preferred embodiment, the binary numbers are 16 bit numbers, although only 10 bits are used.

In a preferred embodiment, the large spacemap array binary number 284 (0000001111111101=1,021 in decimal units) tells the file system that the corresponding range is relatively full. In such embodiments, the largest binary number 0001000000000(1,024 in decimal) represents a range containing only occupied blocks. The smallest binary number 00000000000000(0 in decimal) represents a range containing entirely free blocks. The small binary number 288 (0000000000001101=13 in decimal units) instructs the file system that the related range is relatively empty. The spacemap 280 is thus a representation in a very compact form of the allocation of all the blocks in the volume broken into 1,024 block sections. Each 16 bit number in the array of the spacemap 280 corresponds to the allocations of blocks in the range containing 1,024 blocks or about 8 MB. Each spacemap block 280 has about 2,000 binary numbers in the array and they describe the allocation status for 16 GB. Unlike the summary map 214, the spacemap block 280 needs to be determined whenever a file needs to be written.

Method of Use

Figure 3:
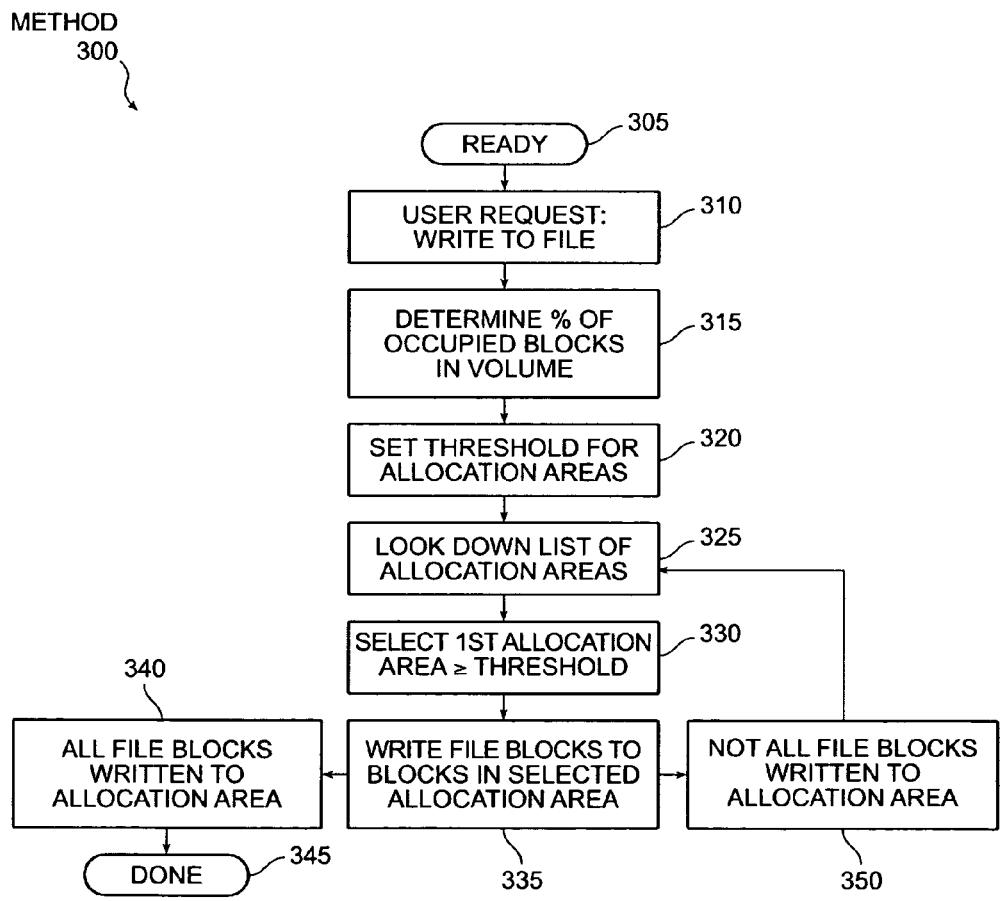
FIG. 3 shows a flow diagram of a method for using a system as shown in FIGS. 1 and 2.

FIG. 3 shows a flow diagram of a method for using the system shown in FIGS. 1 and 2.

A method 300 is performed by the systems 100. Although the method 300 is described serially, the steps of the method 300 can be performed by separate elements in conjunction or in parallel, whether asynchronously, in a pipelined manner, or otherwise. There is no particular requirement that the method 300 be performed in the same order in which this description lists the steps, except where so indicated.

At a flow point 305, the system 100 is ready to perform a method 300.

At a step 310, a user will request to write a file to the file system.

At a step 315, the file system determines the percent of occupied blocks in the entire file system by interrogating information stored in the file system information block.

At a step 320, a threshold for allocation areas is set based on the relative allocation of all the blocks. For example, if 60% of the blocks are available for writing, then a threshold of 55% free could be picked by the file system.

At a step 325, the file system searches linearly through allocation areas looking up spacemap entries from spacemap blocks corresponding to that allocation area, looking for the first allocation area whose free space is a number representing a value greater than or equal to the threshold, in this case 55% free.

At a step 330, the system 100 then selects the first allocation area meeting this criterion.

At a step 335, the system writes the file blocks to the blocks in the selected allocation area. The system checks to be sure that all the blocks for the file have been written to the volume.

At a step 340, if all the blocks of the file are written to this allocation area, the method proceeds to complete the file writing.

At a step 350, if not all the blocks of the file have been written, another iteration for locating an allocation area is needed. The file system again linearly looks down the list of the allocation areas 325 for the first allocation area with a free space percentage value greater than or equal to the threshold set step 320. When the next allocation area meeting this criterion is found, more blocks are written to this allocation area 335. If not all the file blocks are written 350, the method is again repeated until all file blocks have been written and the method is done 345.

At a flow point 345, all the file blocks have been written and the file writing method is done.

ALTERNATIVE EMBODIMENTS

Although preferred embodiments are disclosed herein, many variations are possible which remain within the concept, scope, and spirit of the invention, and these variations would become clear to those skilled in the art after perusal of this application.

The invention claimed is:

1. A method for improved space allocation in a file system having a set of storage blocks in a mass storage system, including
   maintaining an active map of said storage blocks not available for writing data;
   generating, for each one of a plurality of regions of said storage blocks in said mass storage system, a value indicative of a number of storage blocks available for writing data in said region, based on said active map and at least one snapshot of the file system, each said region including a plurality of storage blocks in the active file system and a plurality of storage blocks in each of said at least one snapshot, each said at least one snapshot of the file system having a copy of said active map as said active map existed at a previous time; and
   setting an allocation threshold based on a number of storage blocks available for writing data in the file system;
   comparing the values to the allocation threshold;
   selecting one of said plurality of regions for which the corresponding value has a specified relationship to the allocation threshold; and
   writing the data into the selected one of said plurality of regions.

2. A method as in claim 1, wherein said step of setting comprises setting the threshold based on a percentage of the number of storage blocks available for writing data in the file system.

3. A method as in claim 2, wherein said step of selecting comprises selecting said one of the plurality of regions because the value corresponding to said region exceeds the threshold.

4. A method as in claim 1, wherein each said value is a binary number.

5. A method as in claim 4, wherein each said value is stored in a data block containing one or more binary numbers each corresponding to a unique region.

6. A method as in claim 1, further comprising linearly searching said plurality of regions to select a first region with the corresponding value exceeding the threshold.

7. A method as in claim 1, further comprising selecting an additional region when said data requires more blocks than available in the selected one of said plurality of regions.

8. An apparatus for improved data space allocation including a file system that has a set of storage blocks and a mass storage system; wherein said file system maintains an active map of storage blocks of the set of storage blocks that are not available to write data;

said file system generates, for each one of a plurality of equal regions of said storage blacks in said mass storage system, a value that corresponds to said region and is indicative of a number of storage blocks available to write data in said region, based on said active map and at least one snapshot of the file system, each said region including a plurality of storage blocks in the active file system and a plurality of storage blocks in each 6f said at least one snapshot, each said at least one snapshot of the file system having a copy of said active map as said active map existed at a previous time;

said file system sets an allocation threshold based on a number of storage blocks available for writing data in the file system;

said file system compares the values to the allocation threshold;

said file system selects one of said plurality of regions for which the corresponding value has a specified relationship to the allocation threshold; and said file system writes the data into the selected one of said plurality of regions.

9. An apparatus as in claim 8, wherein said file system sets the allocation threshold based on a percentage of the number of storage blocks available to write data in the file system.

10. An apparatus as in claim 8, wherein said file system selects said one of the plurality of regions because the value corresponding to said region exceeds the threshold, using a linear search of said plurality of equal regions.

11. An article of manufacture comprising a memory with program code stored therein, which, when executed by a processor, directs the processor to cause a file system to perform the steps of any one of claims 1, 2, 3, 5, 6, or 7.

12. A method as in claim 1, wherein said plurality of regions are equal in size.

13. A method as in claim 1, wherein each of said plurality of regions of said storage blocks comprises a plurality of storage blocks, at least some of which store user data.

14. An apparatus as in claim 8, wherein each of said plurality of regions of said storage blocks comprises a plurality of storage blocks, at least some of which store user data.

* * * * *